C. W. SALADEE.

PARLOR-SKATES.

No. 7,345. Reissued Oct. 10, 1876.

Attest:
Fred Benjamin
Courtney A. Cooper

Cyrus W. Saladee
By his atty
Charles Foster

JAMES R. OSGOOD & CO. BOSTON.

UNITED STATES PATENT OFFICE.

CYRUS W. SALADEE, OF WASHINGTON, DISTRICT OF COLUMBIA.

IMPROVEMENT IN PARLOR-SKATES.

Specification forming part of Letters Patent No. 177,166, dated May 16, 1876; reissue No. 7,345, dated October 10, 1876; application filed August 10, 1876.

*To all whom it may concern:*

Be it known that I, CYRUS W. SALADEE, of Washington, District of Columbia, have invented an Improved Parlor-Skate, of which the following is a specification:

My invention consists of a parlor-skate in which the stock is supported front and rear by rollers so hinged to the stock that they will follow the movements of the latter, accommodate themselves to the course it may take, supporting it in any position, but without interfering with or in any manner controlling or affecting its movements.

My invention consists, further, in connecting the roller-frames, so that the lateral and vertical pressure upon each shall be counterbalanced and neutralized by the like pressure on the other; also, in applying a spring to prevent the too free or extended movement of either roller-frame, and in constructing the latter so that one or more rollers may be used in each frame.

Figure 1:
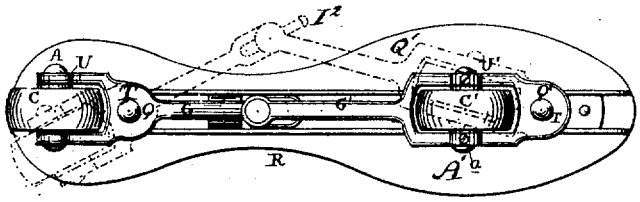
Figure 2:
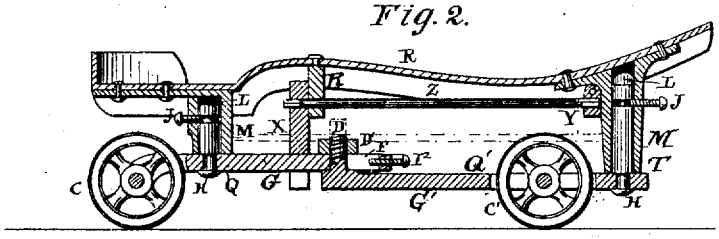
Figure 3:
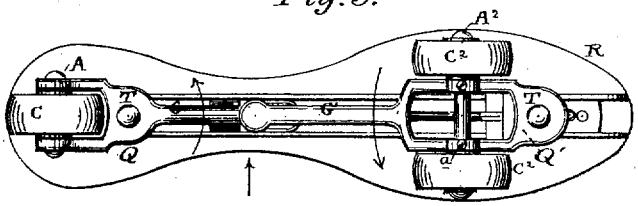
Figure 4:
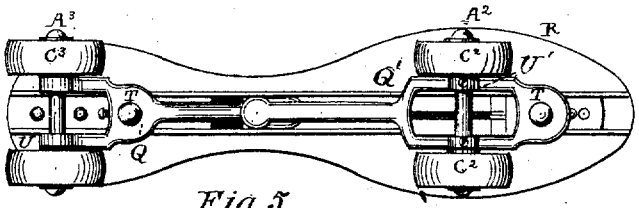
Figure 5:
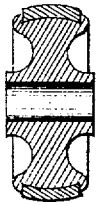

In the drawings, Figure 1 is a bottom plan view of a two-roller skate on the plan of my invention. Fig. 2 is a vertical longitudinal section of the same through the center. Fig. 3 is a bottom plan view, showing three wheels or rollers secured to the same stock. Fig. 4 is a bottom plan view, showing four wheels or rollers secured to the stock; and Fig. 5 is a cross-section of the roller, showing the manner of securing thereto the attachable elastic band or tire.

The roller-frames Q Q′ are arranged below a stock, R, and are provided with ordinary fastenings, are formed with bearings U U′ for the roller-axles, which bearings are constructed to each admit one or more rollers, C C¹, one roller being shown in Figs. 1 and 3. The single-roller axles A A¹ are made removable, and in lieu of them longer axles A² A³ for the double rollers C² C³ may be inserted in the bearings U U′, to which they are secured by set-screws *a*, or by other equivalent means. By this arrangement the skate may be used with one, two, or three rollers at each end, as indicated in the different figures, or as may be desired. Each roller-frame is pivoted in front of the axle and on a line with, or but slightly above, the axle-bearings, to a stud, M, each stud having a socket, L, for a pin or pivot, H, which is connected at the point T to the roller-frame, a screw, J, extending into an annular groove in the pin, which can thus turn, but cannot be withdrawn. As thus applied to the stock, the rollers act precisely as ordinary casters—simply following the stock, self-accommodating to its various movements, which are just as free as, and no more affected by the rollers or supports than those of the stock in an ice-skate. Thus the ordinary natural motion of the foot, pointing it in the direction which it is desired to take, is sufficient to change the course from a straight to a curved direction, or vice versa.

While this is the principle of the movement in my improved skate, the simple application of casters to the opposite ends is not sufficient to make a practicable skate, as the sidewise thrust of the stock in skating would cause casters arranged as usual to turn and permit a direct lateral movement of the skate. To prevent this I combine with the roller-frames a spring, so arranged as to permit a limited oscillating movement of the frames to either side, and to tend to restore each to a position in a line with the other when the skate is moved in a right line or raised from the floor.

In the drawing, the spring Z, secured at one end to a stud, Y, passes freely through a stud, R, and carries at the other end an arm, X, forked to receive an arm, G, extending from the frame Q and jointed to a similar arm, G′, extending from the frame Q′. Any oscillation of the frames will vibrate the arm X and twist the spring Z, the torsional action of which will restore the frames to a central position. But other means of arranging the spring to produce the same effect may be adopted.

It will be noted that the arm G′ is provided with a pin, D, extending through a slot, F, in the arm G, and carrying a nut, D′, and that the arm G overlaps the other. Several important results follow from this arrangement:

First, while the caster-like movement of each wheel is not altered, yet it is caused to facilitate the like movement of the other wheel and preserve a unison of operation.

Second, it permits the oscillating movements to be positively and adjustably regulated by means of a set-screw, I², limiting the play of the pin D in the slot F, thus bringing the frames to positive bearings when the stock is turned vigorously under too heavy a pressure to be resisted by the spring.

Third, it relieves all strains upon the pivots, such as they are subjected to in ordinary casters, by making the vertical pressures counteract and neutralize each other. Thus the tendency of the rear end of the frame G′ being to rise, and the front end of the frame G to descend, each arm G G′ bears upon the other and counterbalances the pressure on the same.

Fourth, it prevents any movement of the frames under the sidewise thrust of the skate. If the frames were independent of each other a direct push upon the stock in the line of the arrow, Fig. 3, would tend to turn the roller-frames in the directions shown by the arrows. By connecting the frames the pressure on one is counterbanced by that on the other, and the lateral pressure upon the stock has no effect in carrying the movable frames out of line with each other; thus, when the skater's body is inclined and the thrust is in a direction across the skate, there is no tendency to disturb the positions of the rollers, and no strains that interfere in the least with the perfect freedom of action in accommodating themselves, caster-like, to the movements of the stock as it is pointed and carried, first in one direction and then in another.

I claim as my invention—

1. A parlor-skate supported by rollers at the front and rear, having caster-like attachments and movements, and arranged to operate substantially as set forth, for the purpose specified.

2. A parlor-skate supported at each end by a roller or rollers, capable of a limited caster-movement round a pivot in front of the axle, and retracted by a spring, substantially as and for the purpose set forth.

3. A parlor-skate in which the foot-stock, supported by front and rear caster-rollers, has its bearing at each end upon a roller-frame in front of the roller-axle, substantially as and for the purpose set forth.

4. A roller-skate in which the stock has its bearings upon the roller-frames, and one of the latter bears upon and counterbalances the other, substantially as and for the purpose set forth.

5. The combination, in a parlor-skate, of roller frames and axles, constructed substantially as described, to support a single roller at the center or two rollers on opposite sides of the center, substantially as and for the purpose specified.

6. In a parlor-skate, the roller-frames Q Q′, spring Z, axle-bearings U U′, and pivots H H′, the whole constructed and arranged to operate substantially as and for the purpose described.

In testimony whereof I have signed my name to this specification in the presence of two subscribing witnesses.

CYRUS W. SALADEE.

Witnesses:
CHARLES E. FOSTER,
COURTNEY A. COOPER.